United States Patent Office 3,298,964
Patented Jan. 17, 1967

3,298,964
LIQUID STABILIZERS FOR VINYL CHLORIDE RESINS COMPRISING METAL SALTS OF EPOXIDIZED FATTY ACIDS
Alfred Szczepanek, Duren-Rolsdorf, and Günter Koenen, Duren, Germany, assignors to Chemische Fabrik Hoesch K.-G., Duren, Rhineland, Germany
No Drawing. Filed Mar. 28, 1963, Ser. No. 268,562
Claims priority, application Germany, Apr. 2, 1962, C 26,631
8 Claims. (Cl. 252—400)

This invention relates to liquid stabilizers for polyvinyl chloride copolymers.

Our copending application No. 157,110 relates to liquid stabilizers for polyvinyl chloride and polyvinyl chloride copolymers, which consists of solutions of barium and/or cadmium soaps of epoxidized fatty acids in organic solvents, which have simultaneously a plasticizing or stabilizing action. Soaps of branched, short-chain, aliphatic carboxylic acids or metal alkyl phenolates may be added to these solutions to enhance their synergistic activity.

It has now been found that, in these liquid stabilizers, the barium or cadmium soaps of epoxidized fatty acids can be replaced wholly or partly by lithium, sodium, potassium, calcium, strontium, magnesium, beryllium, zinc, nickel, manganese, tin, cerium, bismuth or cobalt soaps of the epoxidized fatty acids.

Organic solvents which are compatible with the polymers to be stabilized and which act as plasticizers or in addition give stabilizing properties to the polymer and increase the stabilizing effect of the said metal soaps may be used as solvents. Suitable solvents are alkyl phenols, as for example 2-isopropyl phenol, 2-methyl-4-tert.-propyl phenol, 2,4-dimethyl phenol, 2,5-dimethyl-4-tert.-propyl phenol, 2,4-dimethyl phenol, 2,5-dimethyl phenol and p-nonyl phenol. Various aliphatic compounds containing hydroxyl are also suitable as solvents and for increasing the stabilization properties, such as for example aliphatic, saturated and unsaturated polyalcohols or alkanolamines with at least two hydroxyl groups, and their partial esters or ethers with at least one free hydroxyl group, such as glycol, glycerine, glycerine monooleate, glycol diethyl ether, propylene glycol, hexylene glycol (4-methyl-2,4-pentane-diol), hexinediol and triethanolamine. The so-called mineral oil extenders are also quite suitable as organic solvents, especially those with a high naphthene and paraffin content, as well as the phosphite compounds which are known per se, such as non-volatile triesters of phosphorous acid of the general formula $P(OR)_3$, in which R can be alkyl or aryl radicals, for example, triphenyl phosphite, monooctyl diphenyl phosphite, trioctyl phosphite and monooctyl propylene glycol phosphite. These organic solvents can be used by themselves or, where they are compatible with one another, they can also be used in various mixtures with one another.

The said metal salts of epoxidized fatty acids usually have good solubility in the aforementioned solvents, so that it is possible to produce highly concentrated stabilizer solutions 40 to 60% of the stabilizer and to combine soaps of different metals with one another for specific uses. Thus, it is possible to produce stabilizer combinations of cadmium, barium and zinc or sulphur-insensitive, liquid stabilizers based on calcium, barium, zinc, lithium, sodium and potassium. Non-toxic stabilizers can be obtained with a combination of calcium, magnesium and zinc.

The epoxy fatty acids, the soaps of which serve for the production of the stabilizers according to the invention, may be obtained by methods known per se by epoxidation of the ethylene bond or bonds of naturally existing unsaturated fatty acids, as for example oleic acid, palmitoleic acid, ricinoleic acid, linolic acid.

The stabilizing action of the said metal soaps of epoxidized fatty acids can also be synergistically strengthened by adding metal soaps, of branched, short-chain, aliphatic carboxylic acids. Alkali metals and alkaline earth metals as well as beryllium, nickel, zinc, manganese, tin, cerium, bismuth and cobalt are also suitable as metal components of these soaps. As acid components there are suitable firstly α- or β-branched aliphatic carboxylic acids with 5 to 7 carbon atoms in a straight chain, as for example α-ethylhexanic acid, α-methylheptanic acid, α-methyl-valeric acid or the corresponding β-branched acids, and secondly strongly branched or cyclic aliphatic carboxylic acids with 9 to 19 and especially 9 to 11 carbon atoms. These last-mentioned synthetic acids, also known as Koch acids after their inventor, are obtained by addition of carbon monoxide and water to higher olefines. They are for example described in German patent specification No. 942,-987 and in "Fette, Seifen, Anstrichmittel" 59 (1957), pages 493–498. The salts of these acids are soluble in amounts up to about 60% in the solvent mixture under consideration; in combination with the soaps of epoxidized fatty acids, they not only show a synergistically increased activity, but also influence the solubility in the sense of a reduction of the viscosity as compared with the viscosity with equal concentration of the separate components.

Combinations of the metal soaps, of epoxidized fatty acids with metal alkyl phenolates or combinations of metal soaps of epoxidized fatty acids and branched, short-chain, aliphatic carboxylic acids with metal alkyl phenols have also proved to be suitable. These metal alkyl phenolates are preferably derived from the same alkyl phenols which are used as solvents for the metal compounds.

The metal soap solutions according to the invention are prepared in accordance with the description in the copending application referred to above, the final solution temperature of the metal salts being so adapted to the components present in the solution that the smallest possible degree of discoloration occurs. Generally speaking it is preferable not to exceed solution temperatures of 130° C. to 140° C. Temperatures ranging between 80 and 140° C. are to be used in preparing the stabilizing solutions.

In order that the invention may be further understood, the following examples are given, by way of illustration only:

*Example 1*

9 parts of cadimum epoxystearate
6 parts of barium epoxystearate
4.9 parts of zinc epoxystearate
19.9 parts of a mixture of 2,4; 2,5-dimethyl phenol
4.2 parts of triphenyl phosphite

*Example 2*

| | Parts |
|---|---|
| Lithium salt of the Koch acid $C_9$–$C_{11}$ | 6 |
| Magnesium salt of the Koch acid $C_9$–$C_{11}$ | 1 |
| Zinc salt of the Koch acid $C_9$–$C_{11}$ | 1 |
| Magnesium epoxystearate | 2 |
| Zinc epoxystearate | 2 |
| Nonyl phenol | 5.7 |
| Triphenyl phosphite | 1.9 |
| Hexylene glycol | 0.2 |

Example 3

|   | Parts |
|---|---|
| Calcium salt of the Koch acid $C_9$–$C_{11}$ | 2.4 |
| Magnesium salt of the Koch acid $C_9$–$C_{11}$ | 0.4 |
| Zinc salt of the Koch acid $C_9$–$C_{11}$ | 1.2 |
| Calcium epoxystearate | 4.8 |
| Magnesium epoxystearate | 0.8 |
| Zinc epoxystearate | 2.4 |
| Nonyl phenol | 5.4 |
| Triphenyl phosphite | 1.8 |
| Hexylene glycol | 0.24 |

Two parts of the liquid stabilizer compositions given in the examples of the combinations thereof are tested by the method described in application No. 157,110, filed December 5, 1961 for heat stability and slip effect.

Example 1 is tested in suspension polymerized polyvinyl chloride of the K-value 70.

Examples 2 and 3 are tested in emulsion polymerized polyvinyl chloride of the K-value 70.

The result of the test is shown by the following table:

| Example No. | Oven test 180° C. in minutes | Continuous rolling 170° C. in minutes |
|---|---|---|
| 1 | 70 | 45–50 |
| 2 | 40 | 38 |
| 3 | 40 | 43 |

We claim:

1. Liquid stabilizers for polymeric and copolymeric vinylchloride comprising a solution containing 40 to 60 wt. percent of at least one member selected from the group consisting of lithium, sodium, potassium, calcium, strontium, magnesium, beryllium, zinc, nickel, manganese, tin, cerium, bismuth, and cobalt soaps of epoxidized higher fatty acids having 16 to 18 carbon atoms in an organic solvent capable of simultaneously serving as a plasticizer and/or stabilizer for said polymeric vinylchloride selected from the group consisting of alkyl monohydric phenols, aliphatic polyhydric alcohols, alkanolamines containing at least two hydroxyl groups, partial ethers and esters of aliphatic polyhydric alcohols and alkanolamines containing at least one free hydroxyl group, and non-volatile tri-esters of phosphorous acid ($H_3PO_3$) prepared by heating a mixture of said soap group member and said organic solvent group member at a temperature of from 80 to 140° C.

2. Liquid stabilizer solution according to claim 1 additionally containing a member selected from the group consisting of barium, zinc, and cadmium soaps of epoxidized higher fatty acids having 16 to 18 carbon atoms.

3. Liquid stabilizer solution according to claim 1 additionally containing a soap of $\alpha$ and $\beta$ branched-chain aliphatic carboxylic acids having 5 to 8 carbon atoms and the metals of claim 1.

4. Liquid stabilizer solution according to claim 1 additionally containing a soap of a branched acid having 9 to 19 carbon atoms obtained by the addition of CO and water to higher olefins and the metals of claim 1.

5. Liquid stabilizer solution according to claim 1, additionally containing at least one metal alkyl phenolate wherein the metal of said metal alkyl phenolate is selected from the group consisting of lithium, sodium, potassium, calcium, strontium, magnesium, beryllium, zinc, nickel, manganese, tin, cerium, bismuth, and cobalt, and the alkyl portion of said phenolate has from 1 to 12 carbon atoms.

6. A liquid stabilizer solution produced by heating at a temperature of from 80 to 140° C. a mixture of 9 parts of cadmium epoxystearate, 6 parts of barium epoxystearate, 4.9 parts of zinc epoxystearate, 19.9 parts of a mixture of 2,4; 2,5-dimethyl phenol, and 4.2 parts of triphenyl phosphite.

7. The liquid stabilizer solution of claim 4 produced by heating at a temperature of from 80 to 140° C. a mixture of 6 parts of lithium salt of a $C_9$–$C_{11}$ branched acid, 1 part of magnesium salt of a $C_9$–$C_{11}$ branched acid, 1 part of zinc salt of a $C_9$–$C_{11}$ branched acid, 2 parts of magnesium epoxystearate, 2 parts of zinc epoxystearate, 5.7 parts of nonyl phenol, 1.9 parts of triphenyl phosphite, and 0.2 part of 4-methyl-2,4-pentane-diol.

8. The liquid stabilizer solution of claim 4 produced by heating at a temperature of from 80 to 140° C. a mixture of 2.4 parts of calcium salt of a $C_9$–$C_{11}$ branched acid, 0.4 part of magnesium salt of a $C_9$–$C_{11}$ branched acid, 1.2 parts of zinc salt of a $C_9$–$C_{11}$ branched acid, 4.8 parts of calcium epoxystearate, 0.8 part of magnesium epoxystearate, 2.4 parts of zinc epoxystearate, 5.4 parts of nonyl phenol, 1.8 parts of triphenyl phosphite, and 0.24 part of 4-methyl-2,4-pentane-diol.

References Cited by the Examiner
UNITED STATES PATENTS

| 2,684,353 | 7/1954 | Greenspan et al. | 260—45.75 |
| 2,716,092 | 8/1955 | Leistner et al. | 252—400 |
| 2,813,830 | 11/1957 | Trautman | 252—400 |
| 2,921,917 | 1/1960 | Longman | 260—45.75 |
| 2,944,045 | 7/1960 | Canarios | 260—45.75 |

LEON J. BERCOVITZ, *Primary Examiner.*

M. WEINBLATT, *Assistant Examiner.*